(12) United States Patent
Rüba et al.

(10) Patent No.: US 8,460,761 B2
(45) Date of Patent: Jun. 11, 2013

(54) METHOD FOR REDUCTION OF FORMALDEHYDE EMISSIONS IN WOOD MATERIALS

(75) Inventors: Eva Rüba, Zürich (CH); Stephan Weinkötz, Neustadt (DE); Michael Schmidt, Speyer (DE); Michael Finkenauer, Westhofen (DE); Christian Beil, Worms (DE); Ralph Lunkwitz, Neustadt (DE)

(73) Assignee: BASF SE (DE)

( * ) Notice: Subject to any disclaimer, the term of this patent is extended or adjusted under 35 U.S.C. 154(b) by 739 days.

(21) Appl. No.: 12/161,276

(22) PCT Filed: Jan. 12, 2007

(86) PCT No.: PCT/EP2007/050272
§ 371 (c)(1),
(2), (4) Date: Jul. 17, 2008

(87) PCT Pub. No.: WO2007/082837
PCT Pub. Date: Jul. 26, 2007

(65) Prior Publication Data
US 2010/0190021 A1 Jul. 29, 2010

(30) Foreign Application Priority Data

| Jan. 17, 2006 | (EP) | 06100479 |
| Jul. 27, 2006 | (EP) | 06118001 |
| Jul. 27, 2006 | (EP) | 06118004 |
| Jul. 27, 2006 | (EP) | 06118010 |

(51) Int. Cl.
| B05D 1/18 | (2006.01) |
| B05D 7/00 | (2006.01) |
| B05D 1/02 | (2006.01) |
| B05D 5/00 | (2006.01) |
| B05D 1/28 | (2006.01) |
| B28B 19/00 | (2006.01) |

(52) U.S. Cl.
USPC ..... 427/440; 427/212; 427/427.6; 427/428.1; 106/34

(58) Field of Classification Search
USPC ............... 427/212, 427.6, 428.1, 440; 106/34
See application file for complete search history.

(56) References Cited

U.S. PATENT DOCUMENTS

| 3,900,611 | A | * | 8/1975 | Corbett et al. ................. 427/214 |
| 4,165,409 | A | * | 8/1979 | Maine ........................... 428/535 |
| 4,496,613 | A | * | 1/1985 | Zagefka et al. ............... 427/440 |
| 4,585,703 | A | * | 4/1986 | Taguchi et al. ............... 428/446 |
| 4,701,204 | A | * | 10/1987 | Duvdevani et al. ............. 71/28 |
| 4,892,719 | A | * | 1/1990 | Gesser ......................... 423/245.1 |
| 5,141,784 | A | * | 8/1992 | Beane et al. ................. 427/419.8 |
| 5,187,194 | A | * | 2/1993 | Goettsche et al. ............ 514/499 |
| 5,391,340 | A | * | 2/1995 | Mirous et al. ................ 264/112 |
| 5,554,429 | A |   | 9/1996 | Iwata et al. |
| 5,719,239 | A | * | 2/1998 | Mirous et al. ................ 525/427 |
| 5,721,052 | A | * | 2/1998 | Muthiah et al. .............. 428/413 |
| 5,922,410 | A | * | 7/1999 | Swartz et al. ................ 427/393 |
| 6,103,848 | A | * | 8/2000 | Decker et al. ................. 528/21 |
| 6,114,489 | A | * | 9/2000 | Vicari et al. ................... 528/84 |
| 6,288,208 | B1 | * | 9/2001 | Moshinsky ................... 528/332 |
| 6,624,284 | B1 |   | 9/2003 | Biedermann et al. |
| 7,740,906 | B2 | * | 6/2010 | Ashmore et al. ............. 427/181 |
| 2003/0176538 | A1 | * | 9/2003 | Wu et al. ........................ 524/13 |
| 2004/0030031 | A1 | * | 2/2004 | Martin et al. ................. 524/502 |
| 2005/0150419 | A1 |   | 7/2005 | Zhang et al. |
| 2005/0182180 | A1 | * | 8/2005 | Martin et al. ................. 524/501 |
| 2005/0192402 | A1 | * | 9/2005 | Antal et al. ................... 524/800 |
| 2006/0035091 | A1 | * | 2/2006 | Bruchmann et al. ........ 428/423.1 |
| 2006/0036004 | A1 | * | 2/2006 | Wu et al. ........................ 524/13 |
| 2006/0222877 | A1 |   | 10/2006 | Khabbaz et al. |
| 2006/0260773 | A1 | * | 11/2006 | Tan et al. ........................ 162/70 |
| 2007/0004829 | A1 | * | 1/2007 | Khabbaz ........................ 524/47 |
| 2007/0014754 | A1 | * | 1/2007 | Denkewicz et al. ......... 424/78.27 |
| 2007/0151666 | A1 | * | 7/2007 | Moeller et al. ............... 156/327 |
| 2008/0026152 | A1 | * | 1/2008 | Brient et al. .................. 427/377 |
| 2008/0114097 | A1 | * | 5/2008 | Lunkwitz et al. ............. 524/35 |
| 2010/0022679 | A1 | * | 1/2010 | Ruba et al. ................... 523/103 |
| 2010/0297425 | A1 |   | 11/2010 | Gehringer et al. |
| 2011/0003136 | A1 |   | 1/2011 | Schmidt et al. |

FOREIGN PATENT DOCUMENTS

| DE | 19930525 A1 | 1/2001 |
| EP | 0006486 B1 | 1/1980 |
| JP | 2002273145 | 9/2002 |
| JP | 2002-285125 | 10/2002 |
| JP | 2005/273145 | 10/2005 |
| WO | WO-2004/085125 A2 | 10/2004 |

OTHER PUBLICATIONS

Office action mailed Feb. 16, 2011 in U.S. Appl. No. 12/679,181.

(Continued)

*Primary Examiner* — Liam Heincer
(74) *Attorney, Agent, or Firm* — Novak Druce Connolly Bove + Quigg LLP

(57) ABSTRACT

The present invention relates to a method for the reduction of the formaldehyde emission of wood-base materials by application of nitrogen-containing compounds, wherein
(i) a mixture which comprises at least one polyamine and, if appropriate, up to 20% by weight, based on the mixture, of urea is applied to the wood-base material;
(ii) polyamine is applied on or in the particle or fiber cake;
(iii) polyamine is applied to the coating substrate used for surface finishing and/or
(iv) polyamine is applied to the exposed areas;
the polyamines having a molecular weight of at least 500 g/mol and at least 6 primary or secondary amino groups.

13 Claims, No Drawings

OTHER PUBLICATIONS

U.S. Appl. No. 12/679,181, filed Mar. 19, 2010, Ernst et al.
Wittman, O., "Formaldehydemmission bei der Herstellung und Verarbeitung von Kurztakt-Filmen auf der Basis von Aminoplasten", Holz als Roh- und Werkstoff, 1989, vol. 47, pp. 227-233.
Dunky, M., et al., "Holzwerkstoffe und Leime: Technologie und Einflussfaktoren", 2002, pp. 251-302.
Myers, G. E., "Effects of post-manufacture board treatments on formaldehyde emission: a literature review (1960-1984)", Forest Products Journal, 1986, vol. 36, No. 6, pp. 41-51.
Roffael, E., at al., "Verminderung der Formaldehydabgabe durch Nachbehandlung", Adhäsion, 1990, vol. 4, pp. 13-19.
International Search report May 11, 2007.

* cited by examiner

METHOD FOR REDUCTION OF FORMALDEHYDE EMISSIONS IN WOOD MATERIALS

RELATED APPLICATIONS

This application is a national stage application (under 35 U.S.C. §371) of PCT/EP2007/050272, filed Jan. 12, 2007, which claims benefit of European application 06100479.2, filed Jan. 17, 2006, European application 06118001.4, filed Jul. 26, 2006, European application 06118010.5, filed Jul. 26, 2006, and European application 06118004.8, filed Jul. 26, 2006.

BACKGROUND OF THE INVENTION

1. Field of the Invention

The present invention relates to a method for the reduction of formaldehyde emission in wood-base materials by treatment with polyamines. The present invention furthermore relates to a wood-base material which can be produced by the present method, and to laminates which can be produced by the present method and the use of these wood-base materials and laminates for the production of pieces of furniture, of packaging materials or in interior finishing.

2. Description of the Prior Art

Wood-base materials are an economical and resource-protecting alternative to solid wood and have a quite considerable importance in particular in furniture construction and as construction materials. Wood layers of different thickness, wood strips, wood particles or wood fibers of various timbers serve as starting materials. Such wood parts or wood particles are usually pressed with natural and/or synthetic binders and, if appropriate, with addition of further additives to give sheet-like or strand-like wood-base materials.

Binders used are frequently formaldehyde-containing adhesives, for example urea-formaldehyde resins or melamine-containing urea-formaldehyde resins. The resins are prepared by polycondensation of formaldehyde with urea or melamine. In order to obtain good adhesive properties, as a rule an excess of formaldehyde is used here. This may result in free formaldehyde being present in the finished wood-base material. Additional formaldehyde can be liberated by hydrolysis of the polycondensates. The free formaldehyde present in the wood-base material and the formaldehyde liberated by hydrolysis during the life of the wood-base material can be released into the environment.

Wood itself can also release formaldehyde into the environment, in particular after a heat treatment. Coated wood-base materials generally have a lower formaldehyde emission than uncoated substrates ("Holz als Roh-und Werkstoff" volume 47, 1989, page 227).

Above certain limits, formaldehyde can cause allergies or irritation of the skin, of the respiratory tract or of the eyes in humans. The reduction of the formaldehyde emission in components in the interior area is therefore an important concern.

A reduction of the formaldehyde emission by reduced addition of formaldehyde during the production leads to success only to a limited extent since the adhesive properties of the binder deteriorate with decreasing formaldehyde concentration and the setting of the adhesive is substantially slowed down. This leads to longer production cycles (described in "Holzwerkstoffe und Leime", M. Dunky, P. Niemz, Springer Verlag Berlin-Heidelberg, 2002, 251-302).

A further possibility for the reduction of the formaldehyde emission consists in the addition of formaldehyde scavengers, such as urea, to the wood particles or to the formaldehyde resin. However, a disadvantage of this method is the slower setting rate of the resin. In addition, the mechanical properties of the products are adversely affected.

It has been possible in recent years to reduce the formaldehyde emission of the wood-base materials by various measures. Examples of these are:

G. Myers (Forest Products Journal 1986, Vol. 36 (6), 41-51) gives an overview of possible methods. These range from the use of low molecular weight formaldehyde scavengers, such as urea or ammonia, in solid form (for example as ammonium bicarbonate), in aqueous solution (for example urea solution) or in gas form ($NH_3$) to the application of a coating which acts as a physical barrier.

The gassing of wood-base materials, in particular particle boards, with ammonia (RY AB method, Verko method) and the spraying of the particle boards with formaldehyde scavengers (Swedspan method) have become technically important (E. Roffael and H. Miertzsch, Adhasion 1990, 4, 13-19). In the Swedspan method (EP-B 0006486) the particle boards in the hot state are sprayed with aqueous urea solution or other solutions containing ammonia-eliminating substances. A disadvantage is the poorer coatability of the particle boards thus treated. In the gassing of the wood-base materials with ammonia (RY AB method, Verko method) that the formaldehyde emission increases again with increasing duration of storage has proven disadvantageous (page 16, E. Roffael and H. Miertzsch, Adhasion 1999, 4, 13-19).

WO 2004/085125 A2 describes a method for reducing the emission of adhesively bonded wood-base materials, in which mixtures of aldehyde- and isocyanate-reactive substances are applied to the straightened edges, lying perpendicular to the direction of adhesive bonding. Pollutants escaping both from the wood and from the adhesive are said to be retained thereby. Substances which have an amino or amido group, or hydroxyl-containing substances, can be used for this purpose. For example, urea, guanamine, ethylamine, ethanolamine, proteins, alcohols and carbohydrates are mentioned.

JP 2002-273145 A describes a method for reducing the formaldehyde emission of wood composites, in which a plurality of measures suitable in each case individually for reducing the formaldehyde emission are combined. The aqueous formaldehyde scavenger described is composed of from 20 to 50% by weight of urea, the remainder being a nonvolatile amine, an agent for increasing the permeability of the wood, so that the urea and the nonvolatile amine can penetrate into the composite, and a film-forming solid which, after drying, becomes a physical barrier for the formaldehyde on the wood composite. This film may adversely affect the coatability of the wood composites. Polyalkylenepolyamines are also described as nonvolatile amines. This class of substances is understood generally as meaning short-chain, linear polyamines of the formula $H_2N(-CH_2-CH_2-NH)_n-H$ where n=2, 3 and 4.

In spite of many measures, such as the adaptation of the stoichiometry of the formaldehyde-containing binders or of the addition of formaldehyde scavengers, and different methods for the aftertreatment of wood-base materials, further measures are necessary in order to reduce the emission of formaldehyde from wood-base materials. Furthermore, the emission of formaldehyde from exposed areas which form after the final surface finishing and, if appropriate, an aftertreatment, for example by drilling, milling or sawing, have not been taken into account to date.

Such exposed areas are present, for example, as holes in shelf units or in the backs of pieces of furniture and are required for ensuring a flexibly adjustable height of the shelves. Furthermore, the edges of shelves which do not face the living area are generally not surface-coated and are therefore exposed. In the case of some shelves, even the complete underside is uncoated and therefore constitute exposed areas from which formaldehyde emerges.

SUMMARY OF THE INVENTION

It is accordingly an object of the invention to reduce the formaldehyde emission of wood-base materials, it being intended that neither the mechanical properties nor the coatability of the wood-base materials nor the swelling values be adversely affected as can be caused, for example, by excessively high concentrations of urea in formaldehyde scavengers or by application of ammonium salts.

It is furthermore the object of the invention to reduce the formaldehyde emission of surface-finished wood-base materials without adversely affecting the adhesion or the quality, i.e. the appearance and the resistance, of the surface finish. In addition, the coating process should not be adversely affected.

It is accordingly furthermore the object of the present invention to reduce the formaldehyde emission from exposed areas of surface-finished wood-base material.

The object is achieved starting from the known methods for the reduction of the formaldehyde emission in wood-base materials by application of nitrogen-containing compounds. Accordingly, in the method according to the invention,
(i) a mixture which comprises at least one polyamine and, if appropriate, up to 20% by weight, based on the mixture, of urea is applied to the wood-base material;
(ii) polyamine is applied on or in the particle or fiber cake;
(iii) polyamine is applied to the coating substrate used for surface finishing and/or
(iv) polyamine is applied to the exposed areas;
the polyamines having a molecular weight of at least 500 g/mol and at least 6 primary or secondary amino groups.

DETAILED DESCRIPTION OF THE INVENTION

The term "particle or fiber cake" is understood as meaning sprinkled, glue-coated particles or fibers which, if appropriate, are precompacted. The particle or fiber cake generally has at least twice the thickness of the finished wood-base material.

The term "coating substrate" is understood as meaning, for example, aminoplast resin films, in particular melamine films, preimpregnated materials, sheets, laminates or veneers and the like.

In the present invention, the term "exposed areas" is understood as meaning holes, uncoated exposed edges or areas and the like, as are formed, for example, through subsequent drilling, milling or sawing after the surface finishing.

The polyamine can be applied in aqueous form or without addition of solvents. An aqueous polyamine solution is preferably used.

The aqueous polymer solution is advantageously obtained by mixing of—based in each case on the polymer solution
(a) from 1 to 99% by weight of polyamine
(b) from 0 to 5% by weight of additives for improving the wettability
(c) from 0 to 30% by weight of additives for adjusting the pH
(d) from 0 to 30% by weight of other additives, such as fungicides, water repellents, dyes, organic solvents
(e) from 0 to 50% by weight of urea
and water to make up to 100% by weight, these data being based on the beginning of mixing.

A certain polyamine or mixtures of a plurality of polyamines can be used as component (a).

The aqueous polyamine solution advantageously comprises from 5 to 90% by weight of polyamine, preferably from 10 to 75% by weight of polyamine, in particular from 15 to 45% by weight of polyamine, particularly preferably from 25 to 40% by weight of polyamine, based in each case on the polymer solution.

Preferably used polyamines are those which have a molecular weight of at least 500 g/mol, in particular at least 800 g/mol, and at least 6, in particular at least 10, primary or secondary amino groups. Hyperbranched polyamines, in particular polyethylenimine, or polyvinylamine or mixtures thereof are preferably chosen as polyamines.

In the present invention, the term "hyperbranched polyamines" is understood as meaning highly functional, highly branched and hyperbranched polymers which comprise amino or amido groups.

In the context of the invention, any highly functional, highly branched and hyperbranched polyamines which have a weight average molecular weight greater than 500 g/mol and whose main chain is branched and which have a degree of branching (DB) greater than or equal to 0.05 are used as hyperbranched polyamines. Hyperbranched polyamines having a weight average molecular weight greater than 1000 g/mol, preferably greater than 1500 g/mol, and in particular having a molecular weight of from 1500 to 200 000 g/mol, are preferably used. The degree of branching is advantageously 0.1 or greater. The degree of branching of the hyperbranched polyamines is preferably from 0.2 to 0.99, particularly preferably from 0.3 to 0.95 and in particular from 0.35 to 0.75. For the definition of the "degree of branching", reference is made to H. Frey et al., Acta Polym. 1997, 48, 30.

Advantageously, the hyperbranched polyamines have at least four functional terminal groups, preferably at least eight functional terminal groups, in particular at least twenty functional terminal groups. There is in principle no upper limit to the number of functional groups but the hyperbranched polyamines of the present invention advantageously have less than 500 functional terminal groups, preferably less than 300 functional terminal groups, in particular less than 150 functional terminal groups.

The method of preparation of the hyperbranched polyamines is described, for example, in WO 1996/19537, WO 1999/16810, WO 2005/075541, WO 2005/044897, WO 2003/0066702 and in the prior German patent application with the application number 102005056592.1 and the title "Herstellung and Verwendung von hochfunktionellen, hoch- oder hyperverzweigten Polylysinen".

Advantageously, polycondensates and polyadducts, preferably polyureas, polyamides, polythioureas and combinations of mixed forms having two or more of these functional groups, such as, for example, polyamidoureas and polyamidothioureas, polyurea(thiourea)s, polyureaurethanes and polythioureaurethanes, polyesterureas and polyesterthioureas, polyaminoureas and polyamidothioureas, polycarbonateureas and polycarbonatethioureas, polyetherureas and polyetherthioureas, polyamidourethanes, polyamidoesters, polyamidoamines, polyamidocarbonates, polyamidoethers, polyesterurethanes, polyaminourethanes, polycarbonateurethanes, polyetherurethanes, polyaminoesters, polyesteramides, polyaminocarbonates, polyaminoethers or polyureaurethaneamides, etc., serve as hyperbranched polyamines. Polyureas, polythioureas, polyureaurethanes, polyamides and polyesteramides are particularly preferably used as hyperbranched polymers, in particular polyureas, polyureaurethanes, polyamides and, in the case of the polyamides, particularly preferably polylysines.

The use of polyethylenimine or polyvinylamine or mixtures thereof is very particularly preferred.

The weight average molecular weight of the polyvinylamine is advantageously from 5000 to 500 000 g/mol, preferably from 5000 to 350 000 g/mol, in particular from 5000 to 100 000 g/mol. The weight average molecular weight of the polyethylenimine is advantageously from 500 to 100 000 g/mol, preferably from 500 to 70 000 g/mol, particularly preferably from 500 to 50 000 g/mol, very particularly preferably from 800 to 20 000 g/mol and in particular from 2000 to 20 000 g/mol.

Polyethylenimine can be prepared by acid-catalyzed polymerization of ethylenimine and is obtained as a rule as an aqueous solution having contents of from 20 to 100% by weight, preferably from 40 to 70% by weight, of polyethylenimine. Polyvinylamine can be prepared by polymerization of vinylformamide and subsequent hydrolysis and is obtained as a rule as an aqueous solution of from 2 to 50% by weight, preferably from 5 to 25% by weight. The degree of hydrolysis can be established by the reaction conditions and determines the ratio of amino groups to formamide groups. These solutions can advantageously be used directly as a basis for the polyamine solutions according to the invention.

Ionic and nonionic surfactants, as described, for example, in H. Stache, "Tensid-Taschenbuch", Carl Hanser Verlag, Munich, Vienna, 1981, can be used as optional component (b) of the aqueous polymer solution for improving the wettability, in a concentration of, advantageously, from 0 to 5% by weight, preferably from 0 to 2% by weight.

The pH can be adjusted by the following additives as optional component (c): mineral or organic acids, such as, for example, sulfuric acid or formic acid. Component (c) can be added to the aqueous polymer solution in an amount of from 0 to 30% by weight, preferably from 0 to 20% by weight.

Further additives can be added as optional component (d) to the aqueous polymer solution, for example additives from the group consisting of water repellents, e.g. paraffin emulsions and waxes, fungicides, organic solvents or dyes. Component (d) can be added to the aqueous polymer solution in an amount of from 0 to 30% by weight, preferably from 0 to 10% by weight.

The aqueous polyamine solution can advantageously comprise up to 20% by weight of urea, based on the polymer solution, as optional component (e). Particularly advantageously, the aqueous polymer solution comprises less than 15% by weight of urea, preferably less than 10% by weight of urea and in particular less than 5% by weight of urea, based in each case on the polymer solution. Particularly preferably, the polymer solution is free of urea.

The polyamine solution is advantageously applied with a pH of from 3 to 12.

In case (i), the polyamine solution is preferably applied with a pH of from 7 to 11, particularly preferably with a pH of from 9 to 11, it also being possible for protonation of the polyamines to occur in the less preferred acidic region.

In case (ii) and (iii), the polyamine solution is preferably applied with a pH of from 5 to 10, in particular with a pH of from 6 to 8.

In case (iv), the polyamine solution is preferably applied with a pH of from 6 to 11, in particular with a pH of from 9 to 11.

A sufficient amount of polyamine solution is applied so that the amount of polyamine per square meter of surface of the wood-base material is advantageously from 1 g to 200 g, preferably from 2 g to 50 g, particularly preferably from 3 g to 30 g (case (i)).

In case (ii), a sufficient amount of polyamine solution is applied so that the amount of polyamine per 100 kilograms of particle or fiber cake is advantageously from 0.01 kg to 5 kg, preferably from 0.05 kg to 1 kg, in particular from 0.1 kg to 0.5 kg.

In case (iii), a sufficient amount of polyamine solution is applied so that the amount of polyamine per square meter of coating substrate is advantageously from 0.1 g to 100 g, preferably from 0.5 g to 30 g, in particular from 1 g to 15 g.

In case (iv), a sufficient amount of polyamine solution is applied so that the amount of active substance polyamine per square meter of surface of the exposed area of the surface-treated wood-base material is advantageously from 0.05 g to 200 g, preferably from 0.1 g to 50 g, particularly preferably from 0.3 g to 30 g and in particular from 0.5 to 10 g.

The aqueous polymer solution can be applied to the wood-base material by various measures known to the person skilled in the art (case (i)). These include, for example, spraying on, roll-coating, immersion, coating with a knife coater, spreading or curtain coating; the polyamine solution is preferably applied by spraying on and roll-coating.

The application of the polyamine or of the aqueous polyamine solution to the particle or fiber cake can be effected by various measures known to the person skilled in the art (case (ii)). These include, for example, spraying on, roll-coating, coating with a knife coater, spreading or curtain coating; the amine solution is preferably applied by spraying on.

For example, the aqueous polyamine solution can be applied to the top and/or underside of the fiber cake. The application of the polyamine or of the aqueous polymer solution can be carried out at an elevated temperature or at room temperature.

For example, the polyamine or the aqueous polyamine solution can be applied before or after the cold pressing/precompaction. When the particle or fiber cake has an outer layer-middle layer-outer layer structure, the polyamine or the polyamine solution may be present in one or more layers and/or present between the individual layers. Preferably, the polyamine is applied to the outer layer(s), preferably to both outer layers, of the particle or fiber cake.

The application to the lower outer layer can be effected, for example, indirectly via the application to the conveyor belt which transports the fiber cake to the press. The required amount of polyamine solution is applied to the conveyor belt, for example, by spraying on or rolling on, and the glue-coated particles or fibers are then sprinkled onto the conveyor belt.

For example, the polyamine or the polyamine solution can be applied or sprayed together with the steam used for preheating the material of the press (cf. WO 2004/87388 and references herein).

The particle or fiber cake treated with polyamine is pressed to give a wood-base material by methods known to the person skilled in the art (cf. "MDF—Mitteldichte Faserplatten", Hans-Joachim Deppe, Kurt Ernst, 1996, DRW-Verlag Weinbrenner GmbH & Co., 70771 Leinfelden-Echterdingen, chapter 4.3, page 81 et seq.; cf. also EP 1 192 223 B1, paragraph [0034] and "Taschenbuch der Spanplattentechnik", Joachim Deppe, Kurt Ernst, 2000, DRW-Verlag Weinbrenner GMbH&Co., 70771 Leinfelden-Echterdingen, chapter 3.5, page 232 et seq.).

In case (iii), the application of the aqueous polyamine solution or of the polyamine to the coating substrate can be effected by various measures known to the person skilled in the art. These include, for example, spraying on, roll-coating, immersion, impregnation, coating with a knife coater, spreading or curtain coating. The amine solution is preferably applied by spraying on.

The polyamine solution is preferably applied to the back of the coating substrate, i.e. to the side facing the wood-base material.

The coating substrate is then pressed with the wood-base material by methods known to the person skilled in the art.

For example, in the case of a treatment of a veneer, the aqueous polyamine solution can be applied to the underside of the veneer. After the application of the glue liquor to the wood-base material substrate, e.g. particle board, the veneer thus treated is placed on top and pressed with heat and pressure.

For example, in the case of a treatment of a melamine film, the aqueous polyamine solution can (A) be applied prior to impregnation to the paper, e.g. decorative paper or overlay paper,
(B1) be added to the impregnating resin liquor for preimpregnation,
(B2) be added to the impregnating resin liquor for postimpregnation/coating,
(C) be applied after impregnation of the paper or
(D) be applied only after the drying of the impregnated paper.

The aqueous polyamine solution is preferably applied after drying of the impregnated paper.

The coating substrates resin film or laminate are generally produced by impregnating papers, for example a) soda kraft papers having a basis weight of from 50 to 150 g/m$^2$, b) printed decorative papers having a basis weight of from 50 to 150 g/m$^2$ or c) overlay papers having a basis weight of from 20 to 50 g/m$^2$, by means of aqueous resin solutions, the papers being impregnated with the resin solution and/or the resin solution being applied to the paper by means of a knife coater or being spread on. Thereafter, the substrate is dried to a residual moisture content/water content of from 2 to 8%. It will usually acquire a basis weight of from 100 to 250 g/m$^2$ in case a) and from 50 to 150 g/m$^2$ in cases b) and c).

In case a), i.e. in the case of resin films, these dried substrates are then advantageously sprayed with polyamine, dried and pressed onto HDF, MDF, particle board or the like. The pressure of the pressing is usually from 5 to 80 bar, the pressing time is in general less than one minute, typically from 10 to 30 seconds, and the press temperature is about 160 to 200° C.

In case b), i.e. in the production of laminates, if appropriate a plurality of films are sprayed, dried and then pressed together to give the laminate. A laminate usually consists of a plurality of layers of impregnated core paper, preferably from 2 to 15 core papers, one or more impregnated decorative and/or overlay papers as the surface layer and, if appropriate, one or more impregnated counteracting papers comprising, for example, soda kraft papers. Alternatively, all films used, only individual films, only the core papers or only the film or films facing the interface can be treated, in particular sprayed, with polyamine. Preferably, the outer paper or papers is or are treated.

The pressure for pressing is typically below 100 bar, the pressing time is usually up to 90 minutes and the press temperature is as a rule not more than 150° C. The correspondingly produced laminates are then adhesively bonded to the wood-base material by methods known to the person skilled in the art.

In case (iv), the application of the aqueous polymer solution to the exposed areas can be effected by various measures known to the person skilled in the art. These include, for example, spraying on, roll-coating, coating with a knife coater, spreading or dripping. Preferably, the polyamine solution is applied by spraying on. The surface-finished wood-base material may have an elevated temperature during the application or may be at room temperature; furthermore, the polyamine solution may have an elevated temperature or room temperature during the application. Preferably, the application of the polyamine solution takes place under room temperature conditions.

On the industrial scale, for example during the parallel drilling of holes, the apparatus for application, in particular spraying on, of the polyamine solution can be coupled to the apparatus for drilling or can be arranged laterally offset from it.

For example, an apparatus for rolling on or spraying on the polyamine solution can be integrated into an apparatus for sawing wood-base materials to size.

Suitable wood-base materials are all materials which are produced from wood strips, such as, for example, veneer sheets, plywood boards, wood-base materials produced from wood particles, for example particle boards or OSB boards, and wood fiber materials, such as LDF, MDF and HDF boards. These wood-base materials are produced from the corresponding wood particles with addition of natural and/or synthetic binders by hot pressing. Advantageously, wood-base materials comprising formaldehyde-containing binders are produced by the method according to the invention. OSB boards, wood fiber boards and particle boards are preferred.

The wood-base materials can be surface-treated by sanding after the pressing. The application of the polyamines according to the invention can be effected before or after the sanding, preferably after the sanding. The wood-base material may have an elevated temperature or may be at room temperature during the application. The wood-base material may also be heat-treated, for example by infrared radiation, heated rolls or in a heat tunnel, after the application. The polyamines can be applied to one side or both sides, preferably to both sides.

The invention furthermore relates to the wood-base materials producible by the method according to the invention, in particular wood-base materials which comprise formaldehyde-containing binders and, if appropriate, have been surface-finished. Particle boards and wood fiber boards treated according to the invention and, if appropriate, surface-finished are preferred.

The wood-base materials obtained by the method in case (i) and (ii) can, if appropriate, subsequently be surface-finished. This surface finishing can be effected by coating with various materials. For example, lacquering, veneering, backing or lamination can be carried out or coating with melamine films, preimpregnated materials or sheets can be carried out. The invention also relates to such surface-finished wood-base materials.

The invention therefore furthermore relates not only to the wood-base materials which, if appropriate, have been surface-finished and can be produced by the method according to the invention but also to laminates which comprise at least one polyamine-treated film selected from the group consisting of the counteracting films, core films, decorative films or overlay films.

The wood-base material produced according to the invention advantageously has a formaldehyde emission of from 0 to 0.1 ppm, preferably from 0 to 0.04 ppm, in particular from 0 to 0.02 ppm (EN 717-1 "Formaldehydabgabe each der Prüfkammermethode") or a formaldehyde emission of, advantageously, from 0 to 3.5 mg/m$^2$h, preferably from 0 to 2 mg/m$^2$h, in particular from 0 to 1 mg/m$^2$h (FN 717-2 "Formaldehydabgabe nach der Gasanalyse-Methode").

The wood-base materials according to the invention can be used for the production of pieces of furniture, of packaging materials, in house building, in drywall construction or in interior finishing, for example as laminate, insulating material, wall or ceiling elements.

EXAMPLES

Case (i)

The investigations were carried out with sanded particle boards bonded with urea-formaldehyde glue having a thickness of 16 mm and a density of 650 kg/m³.

Treatment

Example 1

None (Not According to the Invention)

Example 2

Pure Urea Solution (Not According to the Invention)

A 30% strength urea solution was applied to the particle board in an amount which leads to an amount of 40 g/m² of urea, heated to 60° C. for 150 sec and then stored for 1 day at 20° C./65% relative humidity.

Example 3

Polyethylenimine Solution (According to the Invention)

A 30% strength aqueous solution of a polyethylenimine having an average molecular weight of 5000 g/mol was sprayed onto the particle board so that 40 g/m² of polyethylenimine were applied to the particle board. Thereafter, the surface was heated to 60° C. in the course of 150 sec and then stored for 1 day at 20° C./65% relative humidity.

Example 4

Polyethylenimine Solution (According to the Invention)

A 25% strength aqueous solution of a polyethylenimine having an average molecular weight of 5000 g/mol was sprayed onto the particle board so that 5 g/m² of polyethylenimine were applied to the particle board. Thereafter, storage was effected for 1-day at 20° C./65% relative humidity.

Example 5

Reworking of the Formaldehyde Scavenger of Examples 4 to 6 of JP 2002 273145 (Comparative Example)

An aqueous solution comprising, according to JP 2002 273145, 50% by weight of a mixture of:

| | |
|---|---|
| urea | 24% (active substance) |
| N,N-dimethylurea | 1% (active substance) |
| adipic acid dihydrazide | 5% (active substance) |
| N,N-dimethylhydrazine | 1% (active substance) |
| benzylamine | 1% (active substance) |
| triethanolamine | 0.5% |
| sodium diethylhexylsulfosuccinate | 1.2% |
| sodium linoleyl alcohol sulfonate | 1% |
| polyvinyl acetate emulsion (50% strength) | 40% (20% dispersion + 20% water) (active substance) |
| water | 25.3% | and 50% by weight of water, i.e. a 26% strength aqueous solution (based on the active substances), was sprayed onto the particle board so that 5 g/m² of active substance were applied to the particle board. Thereafter, storage was effected for 1 day at 20° C./65% relative humidity.

Formaldehyde Emission:

The formaldehyde emission with or without aftertreatment was determined according to the DIN standard DIN EN717-2 (Determination of the formaldehyde emission, Part 2: Formaldehyde emission by the gas analysis method) from the year 1994, and the DIN standard DIN-EN717-1 (Determination of the formaldehyde emission, Part 1: Formaldehyde emission by the test chamber method) from the year 2004, and the DIN standard DIN-EN 120 (Determination of the formaldehyde content: Extraction process, referred to as perforator method) from the year 1992.

In the case of EN717-2, a test specimen having the dimensions 0.4 m×0.05 m×(thickness of the test specimen in m), with closed narrow surfaces, is investigated in a chamber having a volume of 0.004 m³ at 60° C. and 2+/−1% relative humidity for 4 hours. The air flow is adjusted to 60 l/h. The emerging air is collected for 1 h in each case in a gas wash bottle which comprises an aqueous solution of acetylacetone and ammonium acetate. Formaldehyde reacts in aqueous solution with ammonium ions and acetylacetone to give diacetyl dihydrolutidine (DDL). This reaction is highly specific for formaldehyde. The DDL has an absorption maximum at 412 nm and can be quantitatively detected by spectroscopy. For determining the formaldehyde concentration, the values for the last 3 hours are averaged.

According to EN717-1, two test specimens having dimensions 0.5×0.5×thickness×m³ with 0.75 m exposed edge are placed in a test chamber having a volume of 1 m³. The measurement is carried out for at least 10 to not more than 28 days at 23° C. and a relative humidity of 45+/−3%. The air supply and discharge are chosen so that the total air is exchanged once within 1 hour. For sampling, 120 l of air are passed at a rate of 2 l/min into a gas wash bottle which is filled with aqueous ammonium acetate and acetylacetone solution. The formaldehyde concentration is likewise determined spectroscopically. The formaldehyde emission is obtained by this method from a curve of fit; 4 successive values are permitted to vary by not more than 5%. If this condition has not yet been fulfilled after 28 days, the last 4 values are used for calculating the mean value.

In the case of EN 120, test specimens having the dimensions 25 mm×25 mm×thickness are used. About 110 g of test specimen are placed together with 600 ml of toluene in the flask with perforator attachment. The toluene is brought to the boil. The formaldehyde is released into the water in the perforator and determined photometrically.

TABLE 1A

Results of the formaldehyde emission measurements of Examples 1 to 3

| Board | Aftertreatment | Gas analysis (EN 717-2) | 1 m³ chamber value (EN 717-1) |
|---|---|---|---|
| Example 1 | none | 2.3 mg/m²h | 0.042 ppm |
| Example 2 | 40 g/m² of urea (30% strength aqueous solution) | 1.7 mg/m²h | 0.021 ppm |
| Example 3 | 40 g/m² of polyethyl-enimine (30% strength aqueous solution) | 0.1 mg/m²h | <0.001 ppm |

TABLE 1B

Results of the formaldehyde emission measurements of Examples 1, 4 and 5

| Board | Aftertreatment | Perforator [mg/100 g] |
|---|---|---|
| Example 1 | none | 5.1 |
| Example 4 | 5 g/m² of polyethylenimine (25% strength aqueous solution) | 0.3 |
| Example 5 | 5 g/m² of active substance according to JP 2002 273145, Examples 4 to 6 (26% strength aqueous solution) | 4.6 |

Coatability

After 24 h under standard temperature and humidity conditions (20° C./65% relative humidity), the particle boards 1-3 were coated as follows:

A white decorative paper (80 g/m²) was impregnated with 100 g/m² of a resin liquor comprising Kauramine impregnating resin 792 and curing agent 529 (100:0.3) and dried in an oven at 160° C. The film thus obtained is placed on the surface of the particle board and pressed (190° C., 25 bar, 35 s). For stabilizing the test specimen, a counteracting film is simultaneously pressed onto the back.

For evaluating the coatability, a crosshatch test is carried out. For this purpose, two times four parallel linear cuts (spacing 0.5 cm) are made through the surface by means of a razor blade so that a rhombic pattern forms. In the corners of the rhombuses, partial flaking of the coating occurs. The percentage of destroyed surface area is determined. The smaller the value, the better is the coatability of the particle board.

TABLE 2

Results of the coatability tests of Examples 1 to 3:

| Board | Aftertreatment | Destroyed surface area according to crosshatch test in % |
|---|---|---|
| Example 1 | none | 10 |
| Example 2 | 40 g/m² of urea (30% strength aqueous solution) | 35 |
| Example 3 | 40 g/m² of polyethylenimine (30% strength aqueous solution) | 5 |

Case (iii)

Example 6

Veneering

A 0.6 mm beech veneer was sprayed on the underside with a) 10 g/m² (3 g/m² of active substance) and b) 20 g/m² (6 g/m² of active substance) of a 30% strength aqueous polyethylenimine solution (weight average molecular weight of the polyethylenimine: 5000 g/mol) and then dried.

100 g/m² of a glue liquor comprising 100 parts of Kaurit® glue 329 and 20 parts of Bonit® curing agent 12926 were applied to a commercially available particle board (thickness of 16 mm and density of 650 kg/m³). The veneer was placed on top and pressed on at a press temperature of 105° C. and a pressure of 0.6 N/mm² for pressing. The pressing time was 100 seconds,

Example 7

Decorative Film

Commercially available decorative paper (70 g/m² beech decoration from Süddekor) was cut to a size of about 30 cm×20 cm and impregnated by placing in a sheet-metal trough which was filled with an impregnating resin solution (about 55% strength, based on melamine-formaldehyde resin Kauramin® impregnating resin 792, 0.3% curing agent H 529, 0.1% Kauropal® 933 from BASF AG). The amount of resin applied was adjusted by drawing the paper over a wire doctor blade. Thereafter, the impregnated decorative paper was dried at 120° C. in a laboratory drying oven. After the drying, the weight of the decorative film was 120 g/m² and the residual moisture was 6.5%.

The decorative film was sprayed on the underside with a) 10 g/m² (3 g/m² of active substance) and b) 20 g/m² (6 g/m² of active substance) of a 30% strength aqueous polyethylenimine solution (weight average molecular weight of the polyethylenimine: 5000 g/mol) and then dried.

The decorative film treated with polyamine was pressed onto a commercially available particle board (thickness of 16 mm, density of 650 kg/m³) by means of a laboratory press at 180° C., and the pressure for pressing was 25 bar and the pressing time 30 seconds.

Example 8

Wood-Base Material According to the Prior Art Aftertreated with Urea

A 30% strength urea solution was applied to a commercially available particle board (thickness of 16 mm, density of 650 kg/m³) in an amount which led to an amount of 40 g/m² of urea, heated to 60° C. in 150 seconds and then stored for 1 day at 20° C./65% relative humidity.

A white decorative paper (80 g/m²) was impregnated with 100 g/m² of a resin liquor comprising Kauramin® impregnating resin 792 and curing agent 529 in a ratio of 100:0.3 and dried in an oven at 160° C. The film thus obtained was placed on the surface of the particle board and pressed (190° C., 25 bar, 35 s). For stabilization of the test specimen, a counteracting film was simultaneously pressed onto the back.

Formaldehyde Emission:

The formaldehyde emission of the coated and uncoated particle boards produced according to the examples was determined with the aid of gas analysis (EN 717-2). The results are summarized in Table 3.

TABLE 3

Overview of the formaldehyde emissions of
the particle boards of Examples 6 to 8

| Coating material | Treatment with formaldehyde scavengers | Gas analysis according to EN 717-2 Edges closed [mg of formaldehyde/m²h] |
|---|---|---|
| None | None | 6.0 |
| Decorative film | None | 1.2 |
| Decorative film | 3 g/m² PEI | 0.5 |
| Decorative film | 6 g/m² PEI | 0.3 |
| Decorative film | 40 g/m² U | 0.6 |
| Veneer | None | 4.1 |
| Veneer | 3 g/m² PEI | 2.9 |
| Veneer | 6 g/m² PEI | 2.4 |

PEI: polyethylenimine
U: urea

Coatability:

For evaluating the coatability, a crosshatch test was carried out. For this purpose, two times four parallel linear cuts (spacing 0.5 cm) were made through the surface of the surface-finished particle boards according to Examples 2 and 3 by means of a razor blade so that a rhombic pattern formed. Partial flaking of the coating occurred in the corners of the rhombuses. The percentage of destroyed surface area was determined. The smaller the value, the better was the coatability of the particle board. The coatability results are summarized in Table 4.

TABLE 4

Results of the tests for the coatability of Examples 7 and 8:

| Example | Treatment with formaldehyde scavengers | Destroyed surface area according to crosshatch test in % |
|---|---|---|
|  | none | 10 |
| 7 | 6 g/m² of polyethylenimine (30% strength aqueous solution) | 10 |
| 8 | 40 g/m² of urea (30% strength aqueous solution) | 35 |

Case (iv)

Example 9

The formaldehyde emission of a panicle board coated with a melamine film (E1 particle board, 400 mm×50 mm×16 mm) and whose edges were closed with self-adhesive aluminum foil (0.014 m² edge area) was measured by means of gas analysis (EN 717-2).

Example 10

Analogously to Example 9, the formaldehyde emission of a particle board which was identical to the particle board from Example 9 apart from the fact that the edges had no aluminum foil coating was measured.

Example 11

The exposed edges of the particle board from Example 10 were sprayed with a 20% strength by weight aqueous polyethylenimine solution (weight average molecular weight of the polyethylenimine: 5000 g/mol) in an amount of 4 g of active substance polyethylenimine/m² edge surface area. The formaldehyde emission was measured analogously to Example 9.

TABLE 5

Results of the gas analyses of Examples 9 to 11

| Examples | Gas analysis [mg/m²h] |
|---|---|
| 9 | 0.9 |
| 10 | 3.2 |
| 11 | 1.1 |

Example 12

5 holes having a diameter of 5 mm and a depth of penetration of 9 mm were drilled into the particle board according to Example 9. The formaldehyde emission was measured analogously to Example 9.

Example 13

In the case of the particle board according to Example 12, a 5% strength by weight aqueous polyethylenimine solution (weight average molecular weight of the polyethylenimine: 5000 g/mol) was dripped into the 5 holes in an amount of 5 g of active substance polyethylenimine/m² of inner surface area of the bore (i.e. in an amount of 0.72 g of solution per drilled hole). The formaldehyde emission was measured analogously to Example 9.

TABLE 6

Results of the gas analyses of Examples 12 and 13

| Examples | Gas analysis [mg/m²h] |
|---|---|
| 12 | 1.5 |
| 13 | 0.9 |

We claim:

1. A method for the reduction of the formaldehyde emission of a wood-base material which comprises applying a nitrogen-containing compound to the material, wherein
   (i) a mixture which comprises at least one polyamine and optionally up to 20% by weight, based on the mixture, of urea is applied to the wood-base material;
   (ii) polyamine is applied to the coating substrate used for surface finishing and/or
   (iii) polyamine is applied to the exposed areas;
   the polyamine having a molecular weight of at least 500 g/mol and at least 6 primary or secondary amino groups,
   wherein at least 3 amino groups from among the at least 6 primary or secondary amino groups are primary amino groups, and
   wherein the polyamine used is a hyperbranched polyamine.

2. The method according to claim 1, wherein the hyperbranched polyamine is applied as aqueous polymer solution which is obtainable by mixing, based on the polymer solution,
   (a) from 1 to 99% by weight of hyperbranched polyamine,
   (b) from 0 to 5% by weight of additives for improving the wettability,
   (c) from 0 to 30% by weight of additives for adjusting the pH,
   (d) from 0 to 30% by weight of other additives, and (e) from 0 to 50% by weight of urea and water to make up to 100% by weight, the stated amounts being based on the beginning of mixing.

3. The method according to claim 2, wherein the other additives are fungicides, water repellents, dyes, or organic solvents.

4. The method according to claim 2, wherein the aqueous hyperbranched polyamine solution
   (i) is applied to the wood-base material by spraying on, roll-coating, immersion, coating with a knife coater or spreading;
   (ii) is applied to the coating substrate by spraying on, roll-coating, immersion, impregnation, coating with a knife coater or spreading and/or
   (iii) is applied to the exposed areas by spraying on, roll-coating, coating with a knife coater or spreading.

5. The method according to claim 1, wherein the hyperbranched polyamine has a molecular weight of at least 800 g/mol and at least 6 primary or secondary amino groups.

6. The method according to claim 1, wherein the hyperbranched polyamine has a weight average molecular weight greater than 1000 g/mol.

7. The method according to claim 1, wherein the amount of hyperbranched polyamine applied
   (i) is from 1 g to 200 g per square meter of surface of the wood-base material;
   (ii) is from 0.1 g to 100 g per square meter of coating substrate and/or
   (iii) is from 0.05 to 200 g per square meter of surface of the exposed area of the surface-treated wood-base material.

8. The method according to claim 1, wherein the wood base material is veneer wood, plywood, OSB, wood fiber boards or particle board optionally comprising formaldehyde-containing binders.

9. The method according to claim 1, wherein, in case (i), the wood-base material is heat-treated after application of the hyperbranched polyamine or of the hyperbranched polyamines.

10. The method according to claim 1, wherein the coating substrate is melamine film, preimpregnated material, sheet, laminate or veneer.

11. The method according to claim 1, wherein holes or uncoated areas or edges in case (iii) are aftertreated.

12. The method according to claim 1, wherein the hyperbranched polyamine has a degree of branching of 0.3 to 0.95.

13. The method according to claim 1, wherein the hyperbranched polyamine has a degree of branching of 0.35 to 0.75.

* * * * *